United States Patent [19]

Burke

[11] Patent Number: 5,727,201
[45] Date of Patent: Mar. 10, 1998

[54] ONLINE DATA RETRIEVAL SYSTEM

[75] Inventor: Trevor John Burke, Birkenhead, United Kingdom

[73] Assignee: Phonelink PLC, Birkenhead, United Kingdom

[21] Appl. No.: 374,517

[22] PCT Filed: Jun. 3, 1994

[86] PCT No.: PCT/GB94/01221

§ 371 Date: Jan. 17, 1995

§ 102(e) Date: Jan. 17, 1995

[87] PCT Pub. No.: WO94/29808

PCT Pub. Date: Dec. 22, 1994

[30] Foreign Application Priority Data

Jun. 4, 1993 [GB] United Kingdom .................. 9311580

[51] Int. Cl.⁶ ........................................ G06F 17/30
[52] U.S. Cl. ................. 395/610; 395/603; 395/201; 395/200.08; 395/200.09
[58] Field of Search ............................ 395/600, 603, 395/604, 610, 200.08, 200.09; 364/419.11, 419.12, 49.13, 419.19

[56] References Cited

U.S. PATENT DOCUMENTS

| | | | |
|---|---|---|---|
| 4,771,385 | 9/1988 | Egami et al. | 364/419.13 |
| 4,959,785 | 9/1990 | Yamamoto et al. | 364/419 |
| 5,303,361 | 4/1994 | Colwell et al. | 395/427 |
| 5,325,290 | 6/1994 | Cauffman et al. | 364/207 |
| 5,333,313 | 7/1994 | Heising | 395/601 |
| 5,375,235 | 12/1994 | Berry et al. | 395/601 |
| 5,388,257 | 2/1995 | Bauer | 395/601 |
| 5,457,738 | 10/1995 | Sylvan | 379/96 |

OTHER PUBLICATIONS

International Search Report dated Sep. 15, 1994, Appl No. PCT/GB/01221.

Primary Examiner—Thomas G. Black
Assistant Examiner—Hosain T. Alam
Attorney, Agent, or Firm—Loeb & Loeb LLP

[57] ABSTRACT

A data retrieval system in which data to be retrieved is stored in the memory of a host computer and accessed from user terminals which transmit requests for data to the host. Data is stored in the host computer in the form of a series of search terms arranged in a predetermined logical order, and each stored search term is stored with associated data to which users require access. Data retrieval requests are entered by users in the form of search terms corresponding in logical structure to the search terms stored in the host computer. The host computer memory is partitioned into a series of blocks in each of which is stored both search terms falling within a respective predetermined range of the logical order and the data associated with these search terms. Each user terminal has a memory in which is stored an index that cross references the memory address of each block in the host memory with the range of search terms stored within that block. Each user terminal responds to entry of a search term by identifying from the index the memory address of the block storing the range of search terms including the entered search term, and transmitting the identified memory address to the host. The host computer responds by transmitting the content of the block identified by a received memory address to the user terminal from which the received memory address was transmitted. Each user terminal displays data transmitted to it from the host to enable the terminal user to select the data of interest from the received block contents.

4 Claims, 5 Drawing Sheets

ONLINE DATA RETRIEVAL SYSTEM

BACKGROUND OF THE INVENTION

1. Field of the Invention

The present invention relates to a data retrieval system.

2. Description of the Related Art

Data retrieval systems are well known which enable system users to gain access to data stored on a central database from remote terminals. One simple example of such a system is a conventional telephone number directory system in which the name of a telephone subscriber, the address of that subscriber, the postcode of that subscriber and the telephone number of that subscriber are stored. Data is generally organised in such systems in alphabetical name order to enable simple access by entering a subscriber's name and searching through the stored names for a match with the entered name. If a match is located, or a similar name is located, the associated address and telephone number dam can be retrieved. It will of course be appreciated that on such a database the data could be searchable in for example telephone number order or postcode order, depending on what users required. However the data is organised, it is fundamental to such systems that search terms (for example names) are organised in a logical order (for example alphabetical order) so that the database can be rapidly and reliably searched to find a match with an entered search term.

It is conventional practice with data retrieval systems exemplified by the telephone directory service mentioned above to provide a single central "host" computer which stores all of the relevant data, and a distributed series of subscriber terminals from which access to the host computer can be gained to obtain the data required. The host computer is a sophisticated mainframe computer capable of rapidly searching through the stored dam in response to a large number of simultaneous requests, whereas the subscriber terminals are relatively "dumb" machines which so far as the searching process is concerned act as simple input and output devices. This system structure has been adopted for two very good reasons. Firstly, it is vital to be able to update databases on a regular basis, and this means that updating must be controlled at a central location. It is simply not practical to distribute updated information to a large number of terminals in a reliable manner. Secondly, as the economics of data retrieval systems are generally based on the principle of charging users in proportion to their use of the system, it is very important that the system operator retains full control of access to the stored data. For this reason it is highly undesirable to provide subscriber terminals with copies of significant portions of the database.

Thus, in the conventional data retrieval systems, the user keys in a search term, that search term is transmitted to the host computer, the host computer then searches through its database for an exact or close match to the keyed in search term, and the host computer then transmits to the subscriber terminal any data which has been located. As the size of databases has increased, and the number of access requests which databases have to handle has increased, it has been necessary to enhance the performance of the host computing system to keep pace with demand. The time taken for a request for data to be processed is fundamental to the economics of such systems. Accordingly system designers have concentrated on reducing the time taken for each data retrieval request to be processed so as to keep pace with users' demands, and many sophisticated solutions to the problems encountered in this development process have been proposed. Unfortunately, as fast as software and hardware system improvements are discovered, the demands on the system increase.

It is an object of the present invention to obviate or mitigate the problems outlined above.

SUMMARY OF THE INVENTION

According to the present invention, there is provided a dam retrieval system comprising a host computer in the memory of which data to be retrieved is stored, and a plurality of user terminals from which requests for data are transmitted to the host and to which data retrieved in response to such requests is transmitted from the host, wherein data is stored in the host computer in the form of a series of search terms arranged in a predetermined logical order, each stored search term being stored with respective associated data to which users require access, and data retrieval requests are entered by users in the form of search terms corresponding in logical structure to the search terms stored in the host computer, characterised in that tile host computer memory is partitioned into a series of blocks in each of which is stored search terms falling within a respective predetermined range of the logical order and the data associated with the search terms falling within the predetermined range, each user terminal comprises a memory in which is stored an index that cross references the memory address of each block in the host memory with the range of search terms stored within that block, each user terminal comprises means responsive to entry of a search term to identify from the index the memory address of the block storing the range of search terms including the entered search term, each user terminal comprises means for transmitting an identified memory address to the host, the host computer comprises means for transmitting the content of the block identified by a received memory address to tile user terminal from which the received memory address was transmitted, and each user terminal comprises means for displaying data transmitted to it from the host.

As a data access request transmitted to the host from a user terminal directly identifies the addresses of the host memory front which data is to be retrieved, the host computer does not have to be capable of conducting sophisticated search routines. The host simply reads out the data from the appropriate block of memory and transmits all that data to the user terminal. This can be done very quickly, which means that the time that the host computer and the communication system linking the host to the user terminal is occupied can be minimised. All that is required in the host is a memory that is organised in a manner that ensures that repartitioning of the memory will either never or very rarely be required.

In a typical example in which the search terms are names and the associated data is in the form of addresses and the like, the host memory will be partitioned on a simple alphabetical basis. Each block of memory will be dedicated to storing a respective range of names, for example one block will store all the names beginning with the letter combination ABB. When the system is first set up, the then available database to be accommodated on the system will be reviewed to decide on the appropriate partitioning of the host memory. It may be ascertained from this review that there are say 20 names within the range of names beginning with the letters ABB. A block of memory is allocated to that range sufficient to accommodate say 40 names and the data associated with 40 names. Thus initially half the memory allocated to a particular memory range will be "redundant".

The host memory allocated to a particular block will have a host memory start address and a host memory address length corresponding to the amount of the block occupied by data. Each user terminal index is then set up to store the correlation between the search term range (all the names starting with the letters ABB), and the related host memory address data, that is the start address and address length. As the database is modified over time by adding to or removing names from the system, the number of names within any one predetermined search term address range will vary but except in extraordinary circumstances will never exceed the space available to receive those names. Thus the host memory partitioning arrangement does not have to be modified and the user terminal indexes do not have to be modified.

If over time something extraordinary does happen and the available space in any one block of host memory becomes insufficient to receive all the search terms allocated to it, one option would be to provide an "expansion" block of memory in the host pointed to by datastored in the block that has "overflowed". It would be undesirable to have to adopt this approach frequently, an in practice given that memory is cheap the system operator will ensure that there is sufficient memory capacity in each block to make the provision of expansion blocks of memory unnecessary in any foreseeable circumstances.

When a user wishes to access data related to for example an individual with the name John Abbott, the user would key in the letters ABBOT.J. The user terminal would execute a simple search routine which would follow a tree structure until it reached a branch of the tree identifying a particular block of host memory. In this case where one block is allocated to all names starting with the letters ABB, the tree branch would terminate after the first three letters of the name had been entered with the host memory address information appropriate to the particular block. Thus as soon as the user had keyed in the first three letters of the name the such terminal would be in a position to transmit the relevant host memory block address information to the host. Once all the content of the appropriate block had been received by the user terminal all of the names contained in that block would be displayed on the terminal screen. The user would then look through the list of names and select that which appeared to be of interest. The full data associated with a selected individual name would then be displays.

In the example given above, it is assumed that only about twenty of the names to be entered on the database initially begin with the letters ABB, and this simple three letter "key word" is sufficient to identify the relevant host memory block. It will be appreciated that the number of characters required to identify a particular host memory block will depend on how common a particular name is and the number of names to be accommodated, assuming that each block stores roughly the same number of names. For example, the name "Smith" can occur very frequently and in such cases the length of "key word" required to identify a host memory block may be large, for example fifteen characters including forenames and street address derails. It is for the system operator to partition the host memory in such a manner that each block of memory stores only a relatively small number of names and provides sufficient spare capacity to accommodate a reasonable expansion of the initial number of names.

BRIEF DESCRIPTION OF THE DRAWINGS

An embodiment of the present invention will now be described, by way of example, with reference to the accompanying drawings, in which.

DESCRIPTION OF THE PREFERRED EMBODIMENTS

Figure 1:
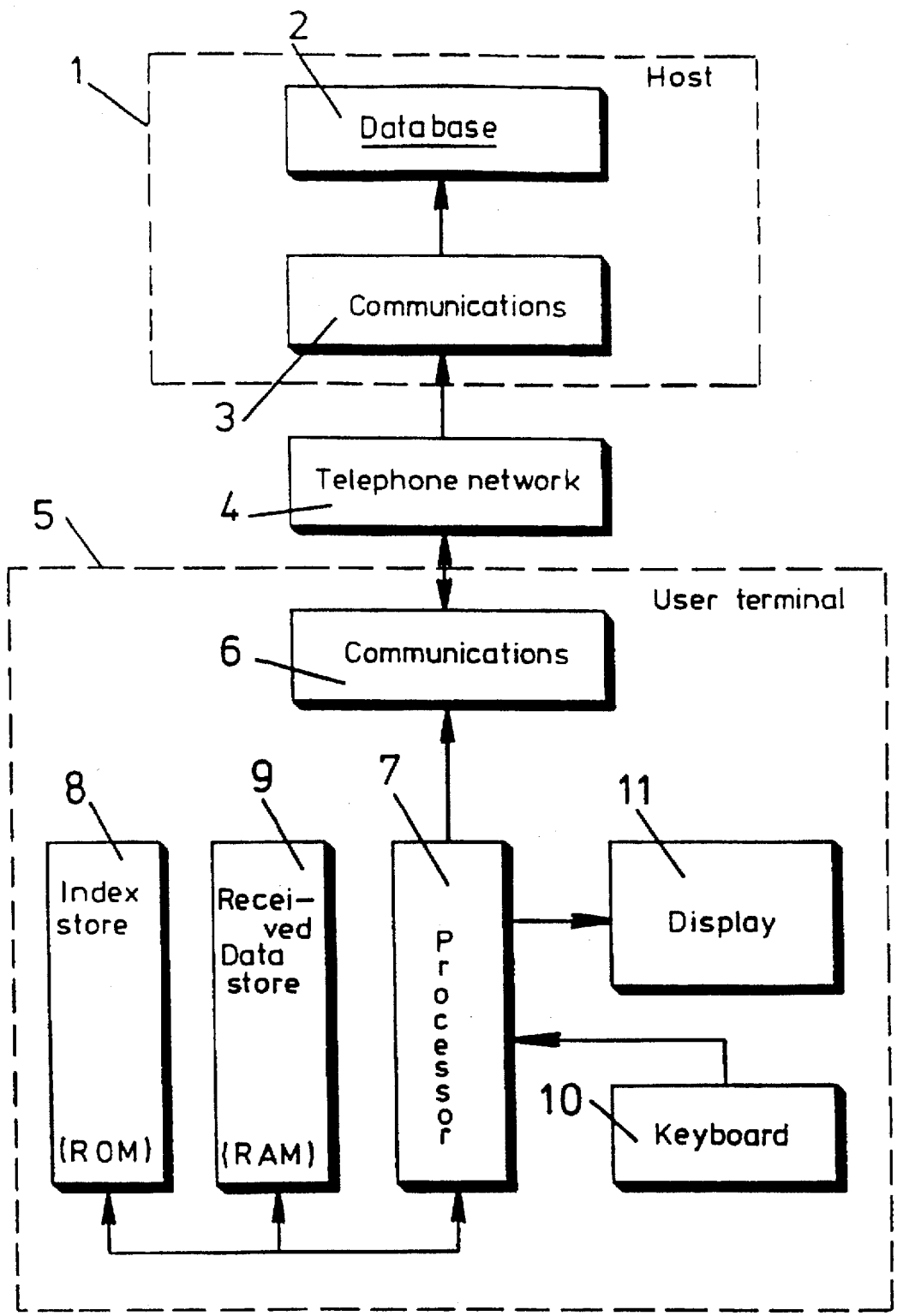
FIG. 1 is a schematic block diagram of the general layout of an embodiment of the present invention.

Referring to FIG. 1, the basic components of the system in accordance with the invention are illustrated. A host computer I stores information to be accessed in a large capacity database 2 which can communicate with the outside world through a communications module 3 linked to a telephone network 4. A user terminal 5 is also connected to that network. It will be appreciated that there will be many user terminals all able to communicate with the single host.

Each user terminal incorporates a communications module 6 which interfaces with a local processor 7. The local processor is linked to a first memory 8 in which an index of the information stored in the host database 2 is retained. The memory 8 operates as a read-only memory, the detail of the index which it stores being fixed. A second memory 9 is provided to enable the storage of data supplied to the user terminal from the host. Thus the second memory 9 is a random access memory. The processor 7 is also linked to a keyboard 10 and a visual display unit 11.

In the illustrated case the database 2 stores a telephone directory, that is a series of names each associated with respective address data and a respective telephone number. The system is intended to enable an operator at the user terminal to rapidly access the telephone number of any individual listed in the host database. Thus the nature of the data stored in the database is no different from that stored in conventional paper or computer directory systems. The arrangement of that data is however fundamentally different from conventional systems.

In setting up the database, the host operator first sorts all the names into alphabetical order using a standard approach which for example omits words such as "and", "the" and the like. The particular rules applied are not of immediate importance providing they are applied consistently. In the present case the names are arranged in alphabetical order, the order being applied not only to the characters making up the individual surnames but also to the characters making up the individual's initials and street addresses. Thus the entry "Smith. J. 1 London Road" will appear before "Smith. J. 1 Manchester Road". Once this order has been established the listing of names is broken up into blocks each incorporating only 20 entries. This is illustrated in FIG. 2.

Referring to Rig. 2, the host data file in which all the name, address and telephone number information is stored is represented by the space defined between lines 12 and 13. This space is partitioned as represented by the lines 14, 15 and 16. A block of memory is thus defined between lines 14 and 15 and this will be referred to as the "nth" block, a further block is defined between lines 15 and 16 and this will be referred to as the "n+1" block and further blocks are of course defined in the space represented above line 14 and below line 16. Block n will store data in alphabetical order, and block n+1 will also store data in alphabetical order, the last entry in block n being immediately before the first entry in block n+1 in the predetermined alphabetical order.

Figure 2:
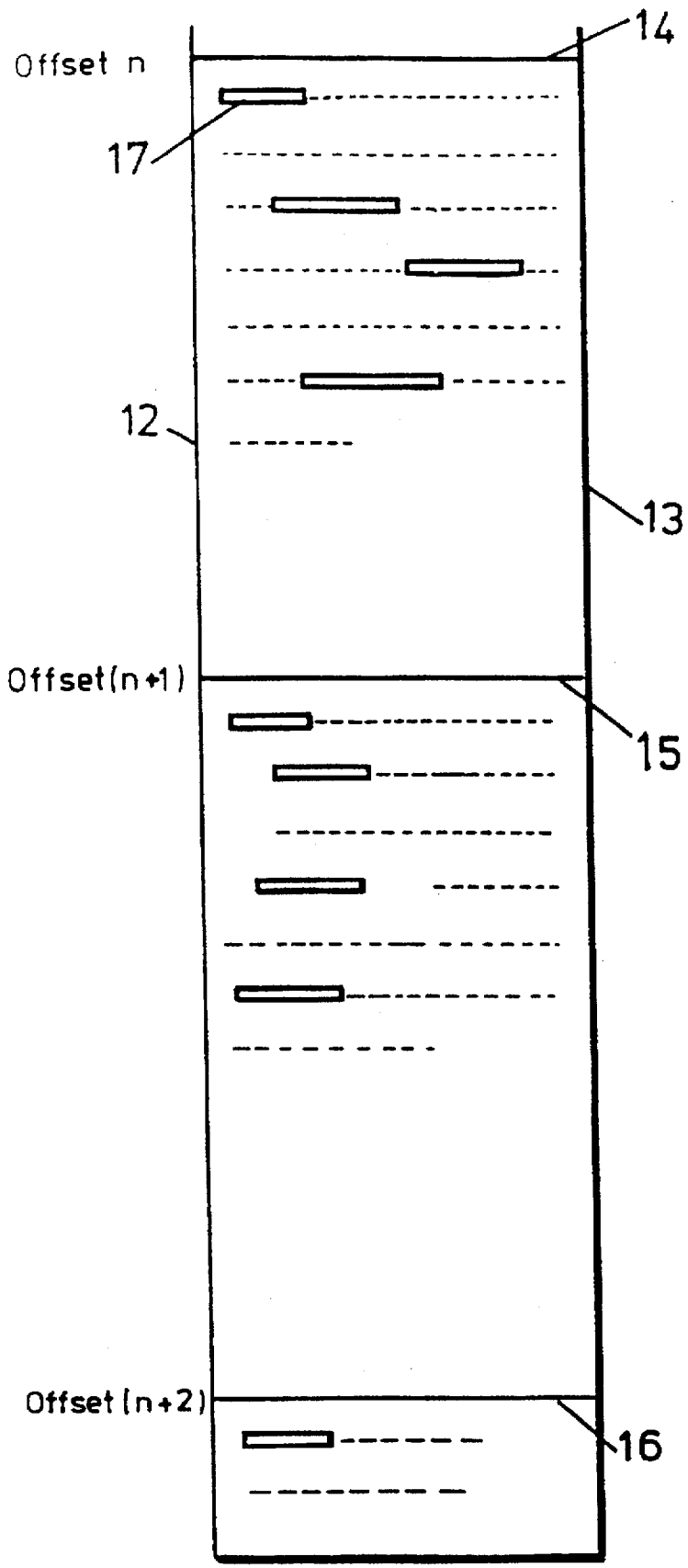
FIG. 2. is a schematic representation of the distribution of data in the database of the system illustrated in FIG. 1.

Each entry in the database, that is the combination of a name, an address and a telephone number, is broken into two components, that is a component represented by a rectangle, for example rectangle 17, and a component represented by the dotted line following each rectangle in FIG. 2. The data represented by each rectangle 17 is the data that will be incorporated in a list of all of the items included in each block of host memory that is displayed on the user terminal to enable the user to make a selection from those entries. Typically this will be no more than a name and initials, but where there are reputed entries showing the same name and initials the item 17 will incorporate some of the address information to enable the user to discriminate between the different entries. It will be noted that the blocks of memory represented in FIG. 2 are shown as only being about half filled. When the database is first set up, 20 entries will be incorporated into each block, but each block will have enough space to incorporate twice that number of entries. This built in redundancy is represented in FIG. 2 simply by leaving half of each block blank. Although in FIG. 2, only four entries are shown in each illustrated block, this is done simply to simplify the illustration. In the described arrangement as mentioned above each block will initially receive 20 entries.

The initially redundant space is provided to enable updating of the database to take account of for example the addition of new subscribers to a telephone service. The amount of redundant space should be sufficient to enable each block to absorb all additions to the directory using the previously established alphabetical ordering system and without it being necessary to re-arrange the content of any of the blocks except to add new entries and delete details individuals or companies longer subscribers to the system. Statistical analyses have revealed that, for established systems, it is probable that providing 50% redundancy (i.e. space for 40 average entries when only 20 entries are allocated per block initially) will be sufficient to deal with system expansions and alterations.

Once the host memory has been established, each block of memory can be accessed by direct reference to the offset address. For example, if a request is made for the content of block n, this block can be identified simply by transmitting to the host computer the offset address of that block. The described system operates on the basis that the user terminal transmits to the host the offset address of a block of data to be accessed and the host computer returns the whole content of that block to the user terminal.

Referring back to FIG. 1, the index store of each user terminal has stored within it an index correlating the offset address of each block with the respective range of names and addresses which are allocated to that block. By way of example, let us assume that there are only 18 entries in the directory information to be entered initially which start with the letters ABBOTS. For example, this section of the alphabetical number order could run as follows:

Abbot. A
Abbot. B
Abbot. BB
Abbot. C
Abbot. E.D
Abbots. F
Abbotsford. A
Abbots. G
Abbotswood. G All of the above names and the associated address and telephone number data would be stored in a single block of the host memory, say block n. Each user terminal index would store the correlation between a key word sufficient to identify the range of the alphabetical order allocated to this block with the block offset. In the present case the key word would be ABBOTS. If a name was entered by a user which began ABBOTT that would fall outside the range covered by the block of memory starting at offset address n. Thus the user terminal index correlates two sets of data, that is the alphabetical range of names allocated to any particular block, and the offset address allocated to each of those ranges.

Figure 3:
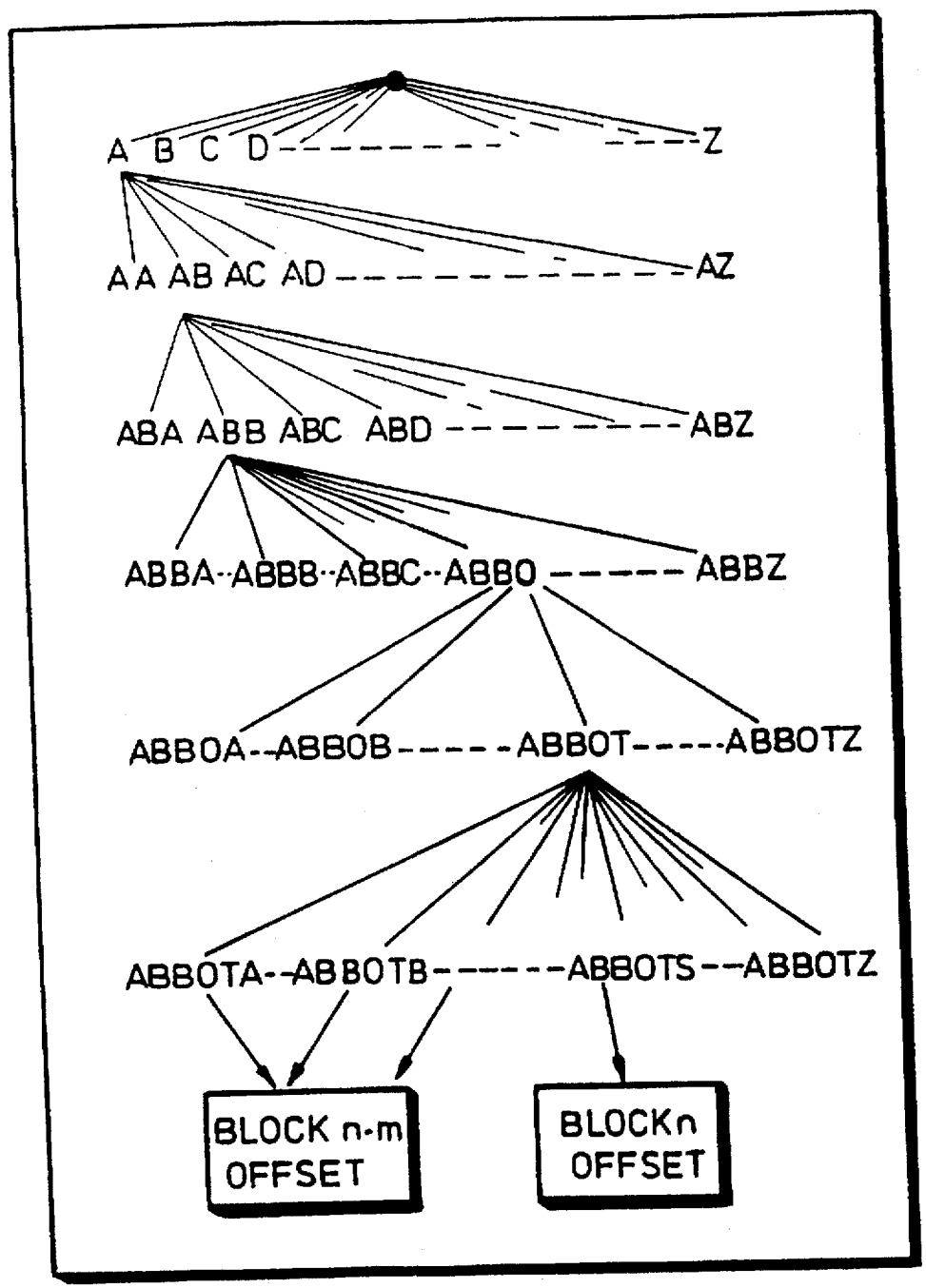
FIG. 3 is a schematic representation of the routines followed to locate a key word is the system illustrated in FIG. 1.

The user terminal is provided with software to enable a search of the local index store so as to determine which range of names an entered name is allocated to. The entered name is in effect a search term which is used as a basis for the such through the index store. The search is conducted on the basis of the key words determined during the establishment of the host database as being sufficient to uniquely identify each of the host database memory blocks. Thus in the case of ABBOTS, a six character key word is sufficient to uniquely identify a particular memory block. In the case of more common names, for example Smith or Williams, a much longer key word would be required, experience indicating that key words up to 15 characters in length might be required. In the case of, for example, Smith, these names would be spread across a large number of blocks and it would be necessary to incorporate not only initial but also address information to adequately identify the blocks. Accordingly the key words would incorporate address information if this was necessary to provide the required discrimination. Once the key words have been established, and this is done once the host database has been partitioned into appropriate blocks, the index can be readily set up and searched following a simple routine. FIG. 3 illustrates such a routine.

FIG. 3 illustrated the search routine that is followed when the user terminal has keyed into it the such term ABBOTS. The entry of each character takes the search routine to a new branch in the searching tree. The time taken for the routine to run on even a simple computer, for example a conventional PC, is sufficiently short for the search to be faster than the normal rate of data entry. Once the user has keyed in ABBOTS. the index points to the offset address of the appropriate host memory block, that is offset n. It will be seen from FIG. 3 that a number of blocks will incorporate names beginning ABBOT but that a single block might store names with a range of sixth characters, for example ABBOTA, ABBOTB. In such cases each of the different key words allocated to a single block would point to a common block offset, for example offset (n–m).

Figure 4:
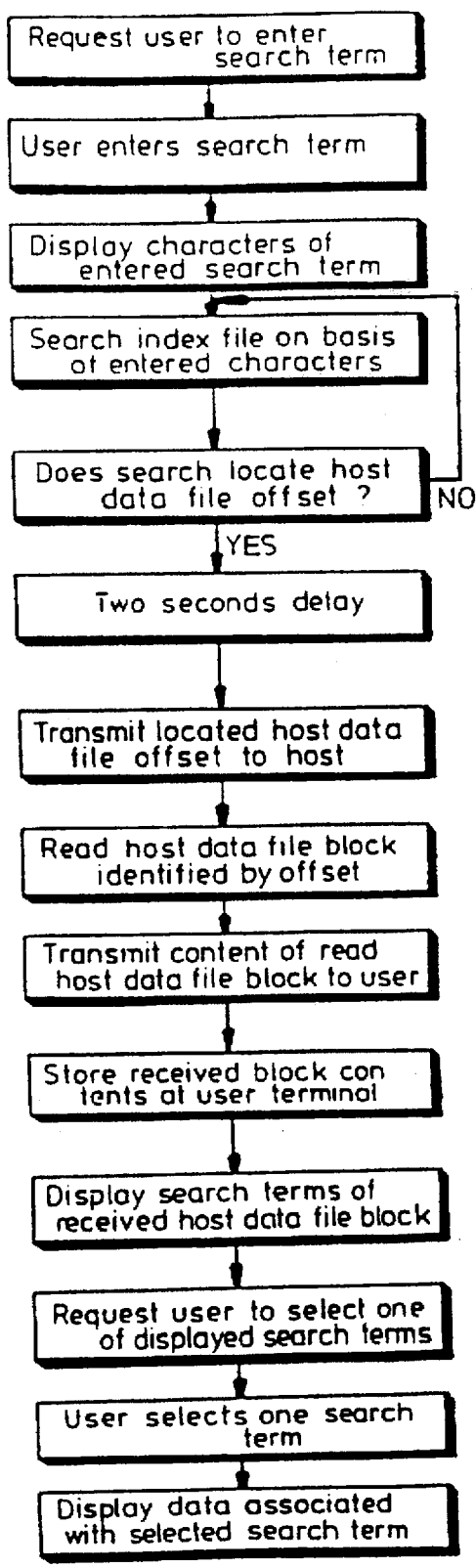
FIG. 4 is a flow diagram illustrating the routines followed in executing a single request for information made by a user in the system illustrated in FIG. 1.

Referring now to FIGS. 1 and 4. the operation of the system in the case of a request to find the telephone number of a subscriber David Abbots will be described. The operator of the user terminal is presented with a screen requesting the entry of the search term, that is the name for which the telephone number is required. Accordingly the operator keys in the letters of the name in the form ABBOTS. D. As each character is entered, the entered character is displayed on the screen and the "key word" so far entered, tidal is the string of characters entered at that stage, is used as the basis for a search of the local index. When the user has only keyed in ABB. the search follows the index search tree as far as it can but does not find a pointer to a block address offset. Accordingly the search is reputed when the next character is entered and this iterative process is followed until a full key word is entered, that being recognised by the user terminal as a result of the search tree pointing to a host address block offset value. Once a key word has been recognised, the associated address offset value is read out to the processor for transmission to the host. Transmission is delay for two seconds, however, to enable the user to recognise having made an error in entering the key word. For example, if the user had entered ABBOTA in error, the user would not want to receive the contents of block n–m. The two second delay provides the user with an opportunity to in effect countermand an earlier entry and correct the sixth character from A to S.

After the two second delay, the offset address read out from the local index is transmitted to the host. No searching through data at the host is performed whatsoever as the host computer simply looks to the block of memory identified by the offset, reads the whole content of that block, and transmits the whole content to the user terminal. Typically this will involve the transmission of approximately 2k bytes of information. The process of reading the content of an identified address from the host memory and transmitting that information through the telephone system takes very little time and accordingly the host is capable of processing a large number of requests in any given interval.

The data transmitted to the user terminal is stored in the local memory and the name information included in that data is displayed on the user terminal screen. The data displayed will correspond to that represented by rectangles 17 in FIG. 2. The user can then visually scan this information and make an appropriate selection. For example, although the system would transmit the content of the appropriate host memory block once the key word ABBOTS had been entered, the resultant display on the screen would include all the names as set out in greater detail above. It would therefore be an easy matter for the operator of the user terminal to select ABBOTS. D by movement of a cursor. Once this selection has been made, the address and telephone number data associated with the selected name, which is already stored in the local memory 9, would be displayed on the screen.

Because no searching has to be conducted at the host database, the host computer is in effect little more than a passive memory. The memory can be made as large as required at relatively little expense. This is in stark contrast to the cost of a mainframe computer capable of storing a large volume of information and searching that information rapidly. Thus the application of the present invention makes it possible to dramatically reduce the cost of the host computer. Furthermore, because the communicated information is in essence no more than an address responded to by the transmission of a limited volume of data contained at that address, the time for which the communications equipment is occupied is relatively small. Utilisation of the communications resources is thus far more efficient than in the case of conventional systems where the user is online for the relatively long periods required for the host computer to conduct searches. As compared with conventional systems, the user terminal is relatively complex and requires a relatively large memory capacity. However, memory is cheap and the processing power of standard personal computers is now such that standard equipment can be used to perform the necessary operations. Overall, the system is far cheaper to set up and operate than a conventional online database system.

It will be appreciated that each user terminal requires an identical copy of the index. It would be unacceptable if this index had to be updated on a regular basis. The provision of redundant memory at the host computer, however, means that it will not be necessary to update the users index store except in extraordinary circumstances or except at very infrequent intervals, for example intervals of years rather than months. If an extraordinary event was to occur, for example the arrival in an area covered by the directory of a large number of individuals all with the same name, it would be possible to accommodate such an event by maintaining the same index but replacing the data stored in the appropriate host memory block by a pointer to a series of sub-blocks. The content of those blocks could be transmitted to the user terminal sequentially. Such an approach to dealing with extraordinary eventualities would be acceptable but clearly the system operator would make every effort to ensure that there was sufficient redundant memory to cover all foreseeable circumstances. Given that memory is so cheap, the system operator could be fairly profligate in providing redundant memory.

In the simple description given above, reference has been made to transmitting the full content of each block to the user terminal when that block is requested. To conserve communication capacity, it would be preferable to ensure that communications time is not occupied by reading out the content of all the block of memory even if half that block is empty. Accordingly appropriate routines would be provided to flag the length of each block of memory storing useful data and terminating a transmission of data once the final useful entry has been read out.

The structure described above provides huge economies as compared with conventional online searching structures, This opens new opportunities for the provision of information online. If a user knows that an enquiry is going to cost say $50 the user will be cautious about using the service. If a user knows that an enquiry is going to cost say $2 utilisation of the services will expand dramatically. Given that the structure of systems in accordance with the invention is not hamstrung by a hardware bottleneck as with conventional systems relying upon a mainframe host coping with extra demand does not require massive further investment in equipment. Accordingly, a pricing structure can be adopted which is based on charging a relatively small amount for many enquiries rather than a relatively large amount for a limited number of enquiries. This will lead to a substantial expansion in the online searching market which in turn will make it worthwhile for system operators to offer a much wider range of services. For example, databases are available which incorporate extensive company data, for example shareholdings, turnover, profit, fixed assets, etc. The system in accordance with the present invention would make the initial location of the appropriate company information a simple operation as once again one would be dealing with a simple directory operation. Once the appropriate company had been identified the relevant financial information could be downloaded in exactly the same way as it is done at present. Given that each user terminal would have a significant memory and processing capacity, however, it would be possible for that information to be locally processed and presented m graphical form. Such a representation of financial information is much more easily digested by the user and would be of immense value to organisations involved in researching financial information.

Figure 5:
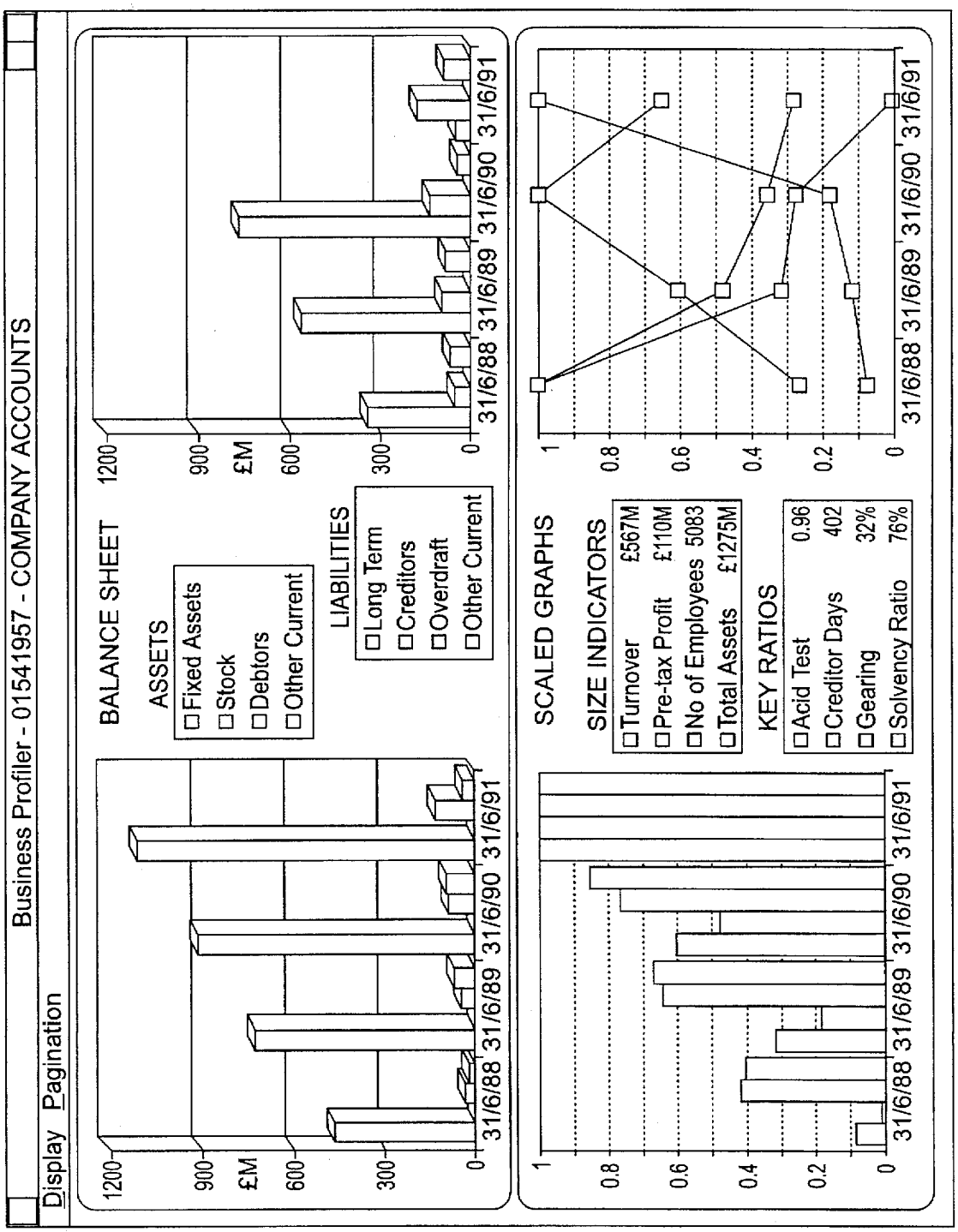
FIG. 5 illustrates an on-screen display that can be produced on a system in accordance with the present invention.

FIG. 5 is a representation taken from the screen of a system in accordance with the present invention based on information related to company number 01541957, that company being Mercury Communications Limited. The particular graphical representation would of course be a function of the software provided at the user terminal and could be tailored to meet individual user requirements. The crucial factor is that the system user receives the basic information from the host database quickly and cheaply and has the processing capacity within the user terminal to represent that information in whatever way is deemed appropriate by the user.

Another example of an appropriate application of a system in accordance with the present invention is the provision of a hotel directory. For example, suppose that one is intending to visit a business at a particular address. It would be very useful to have a local map to enable the visitor to find that address and to locate an appropriately priced hotel close to that address. If the price of such a service can be made sufficiently low, it would be used almost as a matter of course. The present invention enables the provision of such a service at a marketable price. For example, the database referred to above enables company information to be located on the basis of the company name. That company information will include the company's address, including its postcode. A separate database can be set up correlating the postcode to hotel information, including cost, basic standard, services available in each room, etc. The system operator could for example decide that in each postcode area 10 hotels covering four price ranges would be allowed to in effect advertise on the system in return for an appropriate payment. The system user could therefore make a rational decision as to where to stay in any particular area. In addition to the database correlating postcodes to hotels, a further database could correlate the street information to map information, the search term in this case being the street name. Given that one had access to a company's address and postcode, the database would correlate that information with a map reference. The user could thus get a map of the roads in the vicinity of the target address, with general directions as to how to get there from local major roads, a detailed street map of the immediate vicinity, and a map of the local city centre. Thus a businessman could for relatively small expenditure, set out towards a customers premises with a full set of information to enable him to locate his destination with certainty.

It will be appreciated that many other services could be offered once the present invention has enabled the fundamental cost of online searching to be dramatically reduced.

I claim:

1. A data retrieval system comprising a host computer in the memory of which data to be retrieved is stored, and a plurality of user terminals from which requests (for data are transmitted to the host and to which data retrieved in response to such requests is transmitted from the host, wherein data is stored in the host computer in the form of a series of search terms arranged in a predetermined logical order, each stored search term being stored with respective associated data to which users require access, and data retrieval requests are entered by users in the form of search terms corresponding in logical structure to the search terms stored in the host computer, characterised in that the host computer memory is partitioned into a series of blocks in each of which is stored search terms falling within a respective predetermined range of the logical order and the data associated with the search terms falling within the predetermined range, each user terminal comprises a memory in which is stored an index that cross references the memory address of each block in the host memory with the range of search terms stored within that block, each user terminal comprises means responsive to entry of a search term to identify from the index the memory address of the block storing the range of search terms including the entered search term, each user terminal comprises means for transmitting an identified memory address to the host, the host computer comprises means for transmitting the content of the block identified by a received memory address to the user terminal from which the received memory address was transmitted; wherein each said block of memory is allocated a range of searc terms selected such that a substantial portion of each said block will be unoccupied by data to provide for expansion of the volume of data to be stored; and wherein the portion of each said block which is occupied by useful data is flagged and the host computer transmitting means is arranged to transmit only that portion of a selected block which is occupied by said useful data, and each user terminal comprises means for displaying data transmitted to it from the host.

2. A data retrieval system according to claim 1, wherein the search terms are organised in the manner of an alphabetical directory, and the host computer memory is partitioned into blocks each of which is allocated a unique portion of the alphabetical directory such that any entered search item can be allocated to one and only one block.

3. A data retrieval system according to claim 1, wherein the user terminal data displaying means comprises means for displaying the search terms included in the content of the block transmitted from the host computer, means for selecting one search term from the displayed terms, and means for displaying the data associated with the selected one search term.

4. A data retrieval system according to claim 1, comprising means for delaying the transmission of an identified memory address to the host for a predetermined period after entry of the search term associated with the identified memory address.

* * * * *